United States Patent
Spinelli et al.

(12)

(10) Patent No.: US 6,306,521 B1
(45) Date of Patent: Oct. 23, 2001

(54) PIGMENT DISPERSIONS CONTAINING HYDROXYLATED AB-BLOCK POLYMER DISPERSANT

(75) Inventors: Harry J. Spinelli, Wilmington, DE (US); Henry L. Jakubauskas, Chadds Ford, PA (US); Patrick F. McIntyre, Bloomfield Hills; James G. King, Birmingham, both of MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/699,904

(22) Filed: Oct. 30, 2000

Related U.S. Application Data

(62) Division of application No. 09/136,265, filed on Aug. 19, 1998, now Pat. No. 6,187,854, which is a division of application No. 08/896,588, filed on Jul. 17, 1997, now Pat. No. 5,859,113.

(51) Int. Cl.[7] .................................................. B32B 27/30
(52) U.S. Cl. .......................................... 428/522; 428/500
(58) Field of Search ..................................... 428/522, 500

(56) References Cited

U.S. PATENT DOCUMENTS

| | | | |
|---|---|---|---|
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,522,908 | 6/1985 | de Winter et al. | 430/114 |
| 4,524,196 | 6/1985 | Farnham et al. | 526/190 |
| 4,591,533 | 5/1986 | Antonelli et al. | 428/520 |
| 4,656,226 | 4/1987 | Hutchins et al. | 525/93 |
| 4,755,563 | 7/1988 | West | 525/287 |
| 4,812,517 | 3/1989 | West | 525/94 |
| 4,925,765 | 5/1990 | Madeleine | 430/110 |
| 4,948,546 | 8/1990 | Delphin et al. | 264/216 |
| 5,085,698 | 2/1992 | Ma et al. | 106/20 |
| 5,134,187 | 7/1992 | Aihara | 524/548 |
| 5,221,334 | 6/1993 | Ma et al. | 106/20 D |
| 5,272,201 | 12/1993 | Ma et al. | 524/505 |
| 5,310,778 | 5/1994 | Shor et al. | 524/556 |

FOREIGN PATENT DOCUMENTS

| | | |
|---|---|---|
| 0 248 596 | 12/1987 | (EP) . |
| 0 556 649 A1 | 8/1993 | (EP) . |
| 61-221486 | 5/1986 | (JP) . |
| 2-103274 | 4/1990 | (JP) . |
| 4-85551 | 3/1992 | (JP) . |
| WO95/09207 | 4/1995 | (WO) . |

OTHER PUBLICATIONS

G. Reiss, A New Approach to Polymer Dispersions: Use of Block and Graft Copolymers as Surfactants, *Proc. XIth International Conference in Organic Coatings Science & Technology (Athens)*, 45–51, 1985.

Wu, B., Others, (Block copolymer) Pigment Dispersant, *Paint & Coatings Ind.*, 4, 4–9, 1990.

Spinelli, H. L., Group Transfer Polymerisation (GTP) and its Use in Water–based Pigment Dispersants and Emulsion Stailisers, *Proc. XXth International Conference on Organic Coatings Science & Technology (Athens)*, 511–8, 1994.

*Primary Examiner*—Tae H. Yoon
(74) *Attorney, Agent, or Firm*—Steven C. Benjamin

(57) ABSTRACT

A pigment dispersion useful for forming coating compositions containing dispersed pigment, a carrier liquid and an AB-block polymer dispersant (binder);

the AB block polymer has a number average molecular weight of about 5,000–20,000 and contains 20–80% by weight of a polymeric A segment and correspondingly 80–20% by weight of a polymeric B segment; wherein the polymeric A segment of the block polymer is of polymerized glycidyl (meth)acrylate monomers reacted with an acid from the group of aromatic carboxylic acids or aliphatic carboxylic acids; and the B segment is of polymerized alkyl (meth)acrylate monomers having 1–12 carbon atoms in the alkyl group, hydroxy alkyl (meth)acrylate monomers having about 1–4 carbon atoms in the alkyl group; and wherein the weight ratio of pigment to binder in the dispersion is about 1/100–200/100.

2 Claims, No Drawings

PIGMENT DISPERSIONS CONTAINING HYDROXYLATED AB-BLOCK POLYMER DISPERSANT

This application is a division of application Ser. No. 09/136,265, filed Aug. 19, 1998 now U.S. Pat. No. 6,187,854 which, in turn, is a division of application Ser. No. 08/896,588, filed Jul. 17, 1997, which has granted as U.S. Pat. No. 5,859,113.

TECHNICAL FIELD

This invention relates to improved pigment dispersions containing an AB-block polymer dispersant.

BACKGROUND OF THE INVENTION

AB polymer dispersants are known in the art and are used to form pigment dispersions that are used in a variety of coating compositions. U.S. Pat. No. 4,656,226 issued Apr. 7, 1987, to Hutchins et al shows an AB block polymer dispersant having polar groups such as acids or amines that attach to a pigment's surface and the other block of the polymer keeps the pigments stabile in the dispersion or coating composition. U.S. Pat. No. 5,221,334 issued Jun. 22, 1994, to Ma et al also shows AB or BAB block polymers that are used in aqueous printing inks to keep pigments dispersed in the inks.

"Living" free radical polymerization technique, also referred to as group transfer polymerization (GTP) is a well-known technique that is used to form the aforementioned block polymers. In GTP, an initiator splits with one end going to the tail of an acrylic monomer unit and the other to the head. The group at the head transfers to the head of a second monomer unit as that unit is polymerized with the first. Such techniques are described in U.S. Pat. No. 4,417,034 issued Nov. 22, 1983, and 4,508,880 issued Apr. 2, 1985, to O. W. Webster and U.S. Pat. No. 4,414,372 issued Nov. 8, 1983, and U.S. Pat. No. 4,524,196 issued Jun. 18, 1985 to Farnham et al. The above patents are hereby incorporated by reference.

Conventional truck and automobile finishes comprise a clear coat applied over a pigmented base coat that is applied over a primer layer. The polymer dispersant used in the base coat must not only keep the pigment dispersed but needs to contain a reactive group that will react with the crosslinking agent used in the coating composition which on curing makes the dispersant an integral part of the resulting finish. Polymer dispersants can cause intercoat adhesion failures and usually are used only in limited amounts. Its desirable that the polymer dispersant have reactive groups that will bond with the primer layer to improve intercoat adhesion of the base coat to the primer rather than cause intercoat adhesion problems and cause flaking and chipping of the resulting finish.

SUMMARY OF THE INVENTION

A pigment dispersion useful for forming coating compositions containing dispersed pigment, a carrier liquid and an AB-block polymer dispersant (binder);

the AB block polymer has a number average molecular weight of about 5,000–20,000 and contains 20–80% by weight of a polymeric A segment and correspondingly 80–20% by weight of a polymeric B segment; wherein the polymeric A segment of the block polymer is of polymerized glycidyl (meth)acrylate monomers reacted with an acid from the group of aromatic carboxylic acids or aliphatic carboxylic acids; and the B segment is of polymerized alkyl (meth)acrylate monomers having 1–12 carbon atoms in the alkyl group, hydroxy alkyl (meth)acrylate monomers having about 14 carbon atoms in the alkyl group; and wherein the weight ratio of pigment to binder in the dispersion is about 1/100–200/100;

DETAILED DESCRIPTION OF THE INVENTION

The term (meth)acrylate refers to both the acrylate and methacrylate esters.

The novel pigment dispersion is stable and in general is non-flocculated or agglomerated and is compatible with a variety of polymeric film forming binders that are conventionally used in coating compositions and in particular, compatible with acrylic polymers that are used in coating compositions. The AB block polymer dispersant upon curing of the coating composition into which it has been incorporated, reacts with other film forming components of the coating composition and becomes part of the film and does not cause deterioration of the film upon weathering as may occur if it remained an unreacted component of the film. Also, since the AB block polymer is an excellent dispersant, the ratio of polymer to pigment or polymer being dispersed is less than used with conventional dispersants and a large variety of pigments and polymers can be dispersed thereby enlarging the number and types of pigment dispersions that can be formulated. The AB block polymer has reactive groups that improve adhesion to a primer layer thereby reducing flaking and chipping of the coating composition.

It has been found that improved coating compositions are obtained by using these novel pigment dispersions. These coating compositions also contain a film forming binder usually an acrylic polymer and a curing agent such as a polyisocyanate or an alkylated melamine. Such compositions have the advantage of providing excellent coating properties desirable for automotive finishes. Base coats of conventional base coat/clear coat finishes currently used on automobiles and trucks colored with a carbon black pigment dispersion of this invention have significantly improved black jetness in comparison to base coats colored with conventional carbon black pigment dispersions.

The AB block polymer used to formulate the dispersion of this invention can be prepared by anionic polymerization or by Group Transfer Polymerization techniques. Preferably, the polymer is prepared using GTP techniques as described in the aforementioned GTP patents (U.S. Pat. Nos. 4,417,034, 4,508,880, 4,414,372 and 4,524,196). These polymers have a number average molecular weight of about 5,000–20,000, preferably about 7,500–15,000. The A segment of the polymer comprises about polymer and correspondingly the B segment of the polymer comprises about 80–20% by weight of the polymer.

All molecular weights referred herein are determined by GPC (gel permeation chromatography) using a polystyrene standard.

The AB block polymer has a relatively highly polar anchoring A segment and a relatively non-polar stabilizing B-segment. The A-segment is designed to absorb on the surface of the pigment and the B-segment provides a steric stabilization of the pigment particle against flocculation. The A-segment must be available for interaction with the pigment surface; (2) of sufficient size to provide irreversible adsorption; and (3) not so large as to completely cover the pigment surface or cause collapse of the B-segment. The B-segment must be: (1) of sufficient size to provide steric stabilization (approximately number average molecular weight of 1500 or larger); and (2) compatible with the dispersion media, typically a solvent, and polymeric film forming material used in a coating composition.

The AB block polymer can be prepared by anionic polymerization using conventional polymerization catalysts and solvents. Usually, the A segment containing polymerized glycidyl (meth)acrylate monomers is prepared first and then the B segment monomers are added and polymerized. It is possible to prepare the B segment initially and then the A segment to form the AB block polymer.

Preferably, the AB block polymer is prepared by using GTP techniques in an inert atmosphere such as nitrogen by charging solvent such as a mixture of tetrahydrofuran and xylene, a catalyst such as tetrabutyl ammonium m-chlorobenzoate and initiator such as 1-methoxy-1-trimethylsiloxy-2-methyl propene into a polymerization vessel and then adding the A segment monomer which is glycidyl (meth)acrylate. When most of the A-segment monomers have reacted typically over 99%, the B-segment monomers are added of alkyl (meth)acrylates, typically methyl methacrylate and butyl methacrylate and the silane blocked hydroxy alkyl (meth)acrylate, typically trimethylsiloxyethyl methacrylate, and polymerization is completed. An aromatic carboxylic acid or an aliphatic carboxylic acid is then added in a sufficient amount to react with all of the glycidyl groups of the polymer and to unblock the silane group of the hydroxy alkyl (meth)acrylate to form the AB block polymer dispersant used in this invention.

Other typical solvents, GTP polymerization catalysts and initiators used to form the AB block polymers are disclosed in the aforementioned GTP patents.

The A-segment of the polymer contains mainly polymerized glycidyl (meth)acrylate monomers, i.e., glycidyl acrylate or glycidyl methacrylate or mixtures thereof Up to 10% by weight, based on the weight of the A segment, of alkyl (meth)acrylate monomers having 1–8 carbon atoms in the alkyl group (described below) can be used in the A segment.

The B-segment of the polymer contains polymerized alkyl (meth)acrylate and silane blocked hydroxy alkyl (meth) acrylate monomers that are subsequently unblocked with an aromatic or aliphatic carboxylic acid.

Typically useful alkyl (meth)acrylates are having 1–12 carbons in the alkyl group can be used in forming the AB block polymer are methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like and any mixtures thereof can be used. Other monomers that can be used with the alkyl(meth)acrylate monomers are isobornyl methacrylate and benzyl methacrylate.

Typically useful silane blocked hydroxy alkyl (meth) acrylates having 1~carbon atoms in the alkyl group that can be used are trimethylsiloxyethyl methacrylate, trimethylsiloxyethyl acrylate, trimethylsiloxypropyl methacrylate, trimethylsiloxypropyl acrylate, trimethylsiloxybutyl methacrylate, trimethylsiloxybutyl acrylate and the like. When anionic polymerization is used to form the polymer, hydroxy alkyl (meth)acrylate monomers are used that are not blocked with a silane Typically useful aromatic and aliphatic carboxylic acids that can be used are p-nitrobenzoic acid, benzoic acid, p-tert.-butylbenzoic acid, diphenylacetic acid, phthalic acid, isophthalic acid, terephthalic acid, naphthaleneacetic acid, p-toluic acid and the like, acetic acid, butyric acid, isobutyric acid, crotonic acid, cylcohexanebutyric acid, decanoic acid, lauric acid, oleic acid, palmitic acid, propionic acid, sorbic acid, stearic acid, valeric acid and the like. One preferred acid that forms an excellent dispersant polymer is p-nitrobenzoic acid.

In one preferred embodiments, the AB block polymer contains in the A-segment about 10 to 15 parts by weight glycidyl methacrylate that has been reacted with p-nitrobenzoic acid and in the B-segment about 25–35 parts by weight of methyl methacrylate, 25–35 parts by weight of butyl methacrylate and 1–10 parts by weight of hydroxy ethyl methacrylate.

Suitable other olefinically unsaturated monomers that can be used in minor amounts in the AB block polymer include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and fumaric anhydride and its half and diesters; vinyl aromatics such as styrene, alpha methyl styrene and vinyl toluene; and polyethylene glycol monoacrylates and monomethacrylates.

The AB block polymer is used as a dispersing resin to disperse a wide variety of pigments that are commonly used coating compositions. Typical pigments that are used are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones and the like.

To form the pigment dispersion of this invention the AB block polymer and the pigment to be dispersed is added to a suitable mixing vessel such as an attritor, sand mill, ball mill, two roll mill and the like and then mixed for about 5–150 minutes to form a dispersion having a yield stress of about 0–1,000 Pa (Pascal), a low shear (20 sec-1) viscosity of about 10–10,000 m. Pas (milli Pascal seconds) and a high shear (1,000 sec-1) viscosity of about 10–1,000 m Pas measured on a Rotvfisco viscometer.

Coatings compositions in which the pigment dispersions of the present invention are used contain a binder preferably of an acrylic-based polymer and a crosslinking agent such as a melamine crosslinking agent, a polyisocyanate crosslinking agent or a blocked polyisocyanate crosslinking agent in an organic liquid carrier which is usually a solvent for the binder constituents or can be a mixture of a solventinonsolvent to form a NAD (non-aqueous dispersion). The AB block polymers form stable solutions or dispersions, These coating compositions contain about 10–70%, more typically 15–50% by weight of binder, and about 30–90%, more typically 50–85% by weight, of the liquid carrier. Suitable coating compositions are prepared by blending other useful components in accordance with normal paint formulation techniques.

To form a composition which will crosslink under elevated baking temperatures of about 60–180° C. for about 5–60 minutes, about 10 to 50%, preferably 15 to 30% by weight, based on the weight of the binder, of an alkylated melamine formaldehyde crosslinking agent having 1–4 carbon atoms in the alkylated group is preferred.

These crosslinking agents are generally partially or fully alkylated melamine formaldehyde compounds and may be monomeric or polymeric as described above. Blocked polyisocyanates can also be used as crosslinking agents.

These coating compositions containing a melamine crosslinking agent can contain about 0.1 to 1.0% by weight, based on the weight of a binder, of a strong acid catalyst or a salt thereof to lower curing temperatures and time. Para toluene sulfonic acid or its ammonium salt are preferred catalysts. Other catalysts that can be used are dodecyl benzene sulfonic acid, phosphoric acid and amine or ammonium salts of these acids.

Other film forming polymers can also be used in these coating compositions such as acrylourethanes, polyesters and polyester urethanes, polyethers and polyether urethanes that are compatible with the dispersion of the branched polymer. A polyisocyanate can be used as a crosslinking agent to provide a coating composition that will cure at ambient temperatures.

In addition, coating composition utilizing the dispersion of the present invention may contain a variety of other optional ingredients, including fillers, plasticizers, antioxidants, surfactants and flow control agents.

To improve weatherability of a finish of such coating compositions, an ultraviolet light stabilizer or a combination of ultraviolet light stabilizers can be added in the amount of about 0.1–5% by weight, based on the weight of the binder. The stabilizer may be added for example to a dispersion of this invention containing pigments or may be added directly to the coating composition. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), I BYK 320 and 325 (high molecular weight polyacrylates); rheology control agents, such as fumed silica and thickeners such as the Acrylsol® copolymers from Rohm & Haas.

Pigment dispersions of the present invention may be utilized in a mono coat or in a pigmented color coat or base coat over which a clear coat is applied to provide a color coat/clearcoat finish. Also, small amounts of pigment dispersion can be added to the clear coat to provide special color or aesthetic effects such as tinting.

Coating compositions formulated with the dispersion of this invention have excellent adhesion to a variety of metallic or non-metallic substrates, such as previously painted substrates, primed substrates cold rolled steel, phosphatized steel, and steel coated with conventional primers by electrodeposition. These coating compositions can be used to coat plastic substrates such as polyester reinforced fiberglass, reaction injection-molded urethanes and partially crystalline polyamides. In particular, base coat or color coat composition formulated with the dispersion of this invention, provide improved intercoat adhesion between the primer layer and the base coat and improved adhesion to the clear top coat. This improved adhesion results in significantly improved chip resistance of the resulting finish which is very important property for automobile and truck finishes.

Coating compositions formulated with the dispersion of this invention can be applied by conventional techniques such as spraying, electrostatic spraying, dipping, brushing, flowcoating and the like. The preferred techniques are spraying and electrostatic spraying. In OEM applications, the composition is typically baked at 100–150° C. for about 15–30 minutes to form a coating about 0.1–3.0 mils thick. When the composition is used as a clearcoat, it is applied over the color coat that may be dried to a tack-free state and cured or preferably flash dried for a short period before the clearcoat is applied. The color coaticlearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts, ratios and percentages are on a weight basis unless otherwise indicated. All molecular weights disclosed herein are determined by GPC (gel permeation chromatography) using a polystyrene standard.

EXAMPLE 1

An AB block polymer I was prepared and a pigment dispersion was prepared with the polymer and the pigment dispersion was formulated into a coating composition.

Preparation of AB-block Polymer I

To a 5-liter flask fitted with an agitator, condenser, heating mantle, nitrogen inlet, thermocouple and an addition port was added 911 g of tetrahydrofuran, 4.7 g of p-xylene. 1.5 ml of 1.0 M solution of a catalyst of tetrabutyl ammonium m-chlorobenzoate in acetonitrile was added. 26 g of a 0.149 M solution of an initiator of 1 -methoxy-1-trimethylsiloxy-2-methyl propene was injected into the flask. Monomer Feed I GMA (glycidyl methacrylate) 254.5 g (1.79 M) was started at 0.0 minutes and added over 45 minutes. 100 minutes after Feed I was completed (over 99% of the monomer had reacted, Feed II of a mixture of MMA (methyl methacrylate monomer), 448 g (4.48M), BMA (butyl methacrylate monomer) 636.2 g (4.48M) and TMS-HEMA (2-trimethylsiloxyethyl methacrylate monomer), 151.3 g (0.749M) was started and added over 30 minutes. After 300 minutes, 45.3 g water, 800 g propylene carbonate, 269.0 g of p-nitrobenzoic acid (1.61M) and 256 g of butyl acetate were added to the flask and the resulting reaction mixture was held at its reflux temperature and refluxed for 8 hours. The GMA reacted with the p-nitrobenzoic acid and silicone blocking group was removed from the TMS-HEMA. 291 g of butyl acetate was added. The resulting polymer solution has a polymer solids content of 41.5% and the AB block polymer has the following ratio of constituents 12 GMA/1 30 BMA /30 MMA/S HEMA where the GMA is the A-segment and BMA/MM EMA is the B-segment of the polymer and the polymer has a number average molecular weight of about 14,000 and a weight average molecular weight of about 32,000.

Preparation of AB-block Polymer II (control)

This polymer was prepared in an identical manner and with the same constituents as polymer I above except the trimethylsiloxyethyl methacrylate monomer constituent was omitted giving an AB block polymer that does not have hydroxyl groups.

Preparation of a Maroon Pigment Dispersion I

A mixture of 25.3 g of the AB block polymer I (prepared above), 44.7 g butyl acetate and 30.0 g of Perindo Maroon pigment made by Bayer was ground in an 01 attritor for 12 hours at 350 RPM using 3.2 mm stainless steel media. The resulting dispersion has a solids content of 38.8%, a yield stress of 164 dynes/cm$^2$, a drawn down transparency (ASTM E 1348–90) of 79% and a haze level of 16.9% at a dry film thickness of 1.0 mil.

Preparation of Maroon Pigment Dispersion II

The same pigments dispersion was formed as above using the same constituents except that AB-block polymer I was replaced with AB-block polymer II (control). The resulting pigment dispersion has a solids content of 40.5%, a yield stress of 3.6 dynes/cm2, draw down transparency of 79% and a haze level of 5.7% at a dry film thickness of 1.0 mil.

Preparation of Red Coating Composition I

A red metallic high solids basecoat coating composition was prepared by mixing together the following constituents: 252.3 g of acrylic microgel resin (50% nv—non volatile solids), 98.3 g of polyester resin (80% nv), 206.3 g of fully methylated melamine formaldehyde resin (100% nv), 13.9 g of acid catalyst solution (38% nv), 23.5 g of W screener solution (40% nv), 14.7g of UV stabilizer solution (40% nv) and 31.2 g of methanol with 227.6 g of maroon pigment dispersion I (prepared above), 6.3 g of red iron oxide pigment dispersion and 90.7 g of aluminum flake dispersion. The resulting coating composition contained 20.9 parts by weight of dry pigment, 100 parts by weight of dry binder, and the pigment blend weight ratio was 68.3 part maroon pigment/3.3 parts red iron oxide pigment/23.3 parts aluminum flake pigment.

Preparation of Red Coating Composition II (control)

A red high solids basecoat coating composition was prepared using the identical constituents as in Composition I above except the maroon pigment dispersion II made with AB-block polymer II (control) was used instead of the maroon pigment dispersion made with AB-block polymer I.

Preparation of Jet Black Pigment Dispersion I

A mixture of 34.10 g of AB-block polymer I (prepared above), 50.9 g of butyl acetate and 15 g of jet black pigment, FW-200, made by Degussa was ground in a 01 attritor for 24 hours at 350 RPM using 3.2 mm stainless steel media. The resulting dispersion has a solids content of 29.7%, a viscosity of 200 centipoise at 1 rpm and 190 centipoise at 50 rpm using a Brookfield viscometer and a drawdown gloss of 123 measured at 60 degrees.

Preparation of Jet Black Pigment Dispersion II (control)

The same jet black pigment dispersion was formed as above using the same constituents except that AB-block polymer I was replaced with AB-block polymer II (control). The resulting pigment dispersion has a solids content of 29.4%, a viscosity of 100 centipoise at 1 rpm and 80 centipoise at 50 rpm using a Brookfield viscometer and drawdown gloss of 120 at 60 degrees.

Preparation of Jet Black Coating Composition III

A black high solids basecoat coating composition was prepared by mixing together the following constituents: 118.6 g of acrylic microgel resin (50% nv—non volatile solids), 139.0 g of polyester resin (80% nv), 160.5 g of fully methylated melamine formaldehyde resin (100% nv), 10.8 g of acid catalyst solution (38% nv), 18.2g of W screener solution, 11.4 g W stabilizer solution (40% nv) and 102 g xylene and 24.6 g methanol with 91.3 g of black pigment dispersion I (prepared above). The resulting coating composition contained 3 parts by weight of dry black pigment to 100 parts by weight of dry binder.

Preparation of Jet Black Coating Composition IV (control)

A black high solids basecoat coating composition was prepared using the identical constituents as in Composition m above except the jet black pigment dispersion II made with AB-block polymer II (control) was used instead of the jet black pigment dispersion made with AB-block polymer I.

Preparation of Clear Coating Composition

A high solids acrylic clear coating composition was prepared by mixing together the following ingredients: 268.1 g of acrylic copolymer resin (71.5% nv), 155.5 g of acrylic NAD resin (65.5% nv), 198.6 g of fully methylated melamine formaldehyde resin, 11.7 g of acid catalyst solution, 13.5 g of W screener solution, 6.1 g of W stabilizer solution, 1.2 g of flow control additive, 0.8 g of silicone anticratering additive, 86.7 g of xylene and 18.8 g of methanol. The resulting clear coating composition contained 62% binder solids and was sprayed at a spray viscosity of 28 seconds/#4 Ford cup.

Testing of Above Prepared Coating Composition

Standard Conditions

Each of the above prepared Coating Compositions I–IV were sprayed onto separate phosphated, electrocoated and primed steel panels and each 5 coated with the above Clear Coating Composition. Cold rolled steel panels pretreated with zinc Phosphate were electrocoated with about 0.8–1.0 mils of an electrodeposition primer of an epoxy based resin crosslinked with a polyisocyanate and baked for 30 minutes at about 170° C. and about 0.8 mils of a primer surfacer was spray applied and baked for 20 minutes at about 149° C. Each of the above prepared Coating Compositions I–IV were reduced to a spray viscosity of 17 second/#4 Ford cup with xylene and were spray applied to separate panel. The compositions were applied to a dry film thickness of about 0.5–0.7 mils in two coats with a 60 second air dry time between each coat and were allowed to air dry for 3 minutes before the Clear Coating Composition was applied. The Clear Coating Composition was applied in 2 coats to a dry film thickness of 1.8–2.0 mils, allowed to air dry for 10 minutes and then baked for 17 minutes at 130° C.

Repair Conditions

A separate set of panels prepared as above under standard conditions was repaired by recoating the panels to the same film thickness using the same basecoat and clear coat as above and rebaking at the same time and temperatures as used in the standard conditions. No sanding or other surface preparation was done to the panels before the panels were recoated.

The above prepared panels were subjected to the following test:

Gravelometer Chip Resistance Test (ASTM D-3170-87),
Rating (based on number of chips panel): 10 —zero chips, 9—1 chip, 8—2–4 chips, 7—5–9 chips, 6—10–24 chips, 5—25–49 chips, 4—50–74 chips, 3—75–99 chips, 2—100–149 chips, 1—150–250 chips, 0—>250 chips.
Rating (based on chip size)
A=<1 mm
B=1–3 mm
C=3–6 mm
D=>6 mm
Crosshatch Tape Adhesion Test (ASTM D-3359B)
Rating 0%=no loss of adhesion, 100%=complete failure
The results of the tests were as follows:

| Basecoating Composition | Test Condition | Chip Resistance | % Adhesion Loss |
|---|---|---|---|
| Red Basecoating I | Standard | 4 BA | 0 |
| (Invention AB block polymer | Repair | 4 BA | 0 |
| Red Basecoating II | Standard | 3 BA | 0 |
| (AB block copolymer Control) | Repair | 4 BC | 10 |
| Black Basecoating III | Standard | 4 AB | 0 |
| (Invention AB block polymer) | Repair | 4 AB | 0 |
| Black Basecoating IV | Standard | 4 AB | 0 |
| (AB block polymer Control) | Repair | 3 BA | 9 |

The above data shows that the intercoat adhesion under repair conditions is significantly improved by using coating compositions formulated with dispersions of the AB block polymer of the invention

We claim:

1. A substrate coated with a dried and cured layer of a coating composition of an organic liquid carrier, a film forming binder and about 1–50% by weight of the pigment dispersion, wherein the pigment dispersion comprises dispersed pigment, a carrier liquid and an AB-block polymer dispersant (binder);

the AB block polymer has a number average molecular weight of about 5,000–20,000 and consists of 20–80% by weight of a polymeric A segment and correspondingly 80–20% by weight of a polymeric B segment; wherein the polymeric A segment of the block polymer consists essentially of polymerized glycidyl (meth)acrylate monomers reacted with an acid selected from the group consisting of aromatic carboxylic acids and aliphatic carboxylic acids; and the polymeric B segment containing reactive hydroxyl groups consists essentially of polymerized alkyl (meth)acrylate monomers having 1–12 carbon atoms in the alkyl group and hydroxy alkyl (meth)acrylate monomers having about 1–4 carbon atoms in the alkyl group and wherein the weight ratio of pigment to binder in the dispersion is about 1/100–200/100.

2. The substrate of claim 1 having superimposed thereon a clear layer of a coating composition.

* * * * *